Aug. 5, 1952

J. HEZLER, JR 2,605,688

CONTROL MEANS FOR HEATERS

Filed March 3, 1950

INVENTOR.
Julius Hezler, Jr.
BY
Brown, Jackson, Boettcher & Dienner
ATTORNEYS

Aug. 5, 1952  J. HEZLER, JR  2,605,688
CONTROL MEANS FOR HEATERS
Filed March 3, 1950  3 Sheets-Sheet 2

INVENTOR.
Julius Hezler, Jr.
BY
ATTORNEYS.

Aug. 5, 1952  J. HEZLER, JR  2,605,688
CONTROL MEANS FOR HEATERS
Filed March 3, 1950  3 Sheets—Sheet 3

INVENTOR.
Julius Hezler, Jr.
BY
ATTORNEYS.

Patented Aug. 5, 1952

2,605,688

UNITED STATES PATENT OFFICE 2,605,688

CONTROL MEANS FOR HEATERS

Julius Hezler, Jr., South Bend, Ind., assignor to The Studebaker Corporation, South Bend, Ind., a corporation of Delaware Application March 3, 1950, Serial No. 147,504

9 Claims. (Cl. 98—2)

My invention is directed to a new and improved means for controlling the airflow through an automobile heater or the like.

More specifically my invention is concerned with a new and improved actuating linkage adapted to control selectively the movements of a pair of louvers for directing the flow of air through or around a conventional heater coil.

Briefly my invention contemplates a heater for an automobile, or similar vehicle, adapted for ready installation beneath the dashboard or in a like zone. The heater may be a conventional hot water heating core or exchanger across which may be directed a stream of incoming fresh air at the selection of the vehicle passenger. Additionally the passenger may adjust the flow of air to by-pass the heating core to fill the vehicle's interior with fresh unheated air. The selective control of the incoming air stream is by means of a suitable control cable selectively operable to adjust a pair of louvers positioned in an incoming air duct.

The main object of my invention is to provide a unique type of control means capable of actuating a pair of air control louvers in response to a single actuating control cable.

Another object of my invention is to provide a heater control means capable of selectively controlling the air flow across or around a conventional heating core for selectively supplying heated or cool air to the interior of an automobile or the like.

Still another object of my invention is to provide a unique type of walking link for immediately actuating the pair of air control louvers in response to movement of the control cable.

These and further objects will appear from time to time as the following detailed description proceeds where, in order for those familiar with this art to understand the construction and operation of my invention, specific reference is made to the accompanying drawings wherein:

Figure 1 is a schematic perspective view of my control means shown in typical operative connection with an automobile heater or the like;

Figure 11:
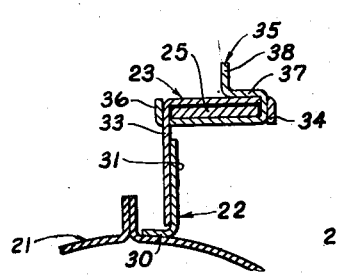
Figure 10:
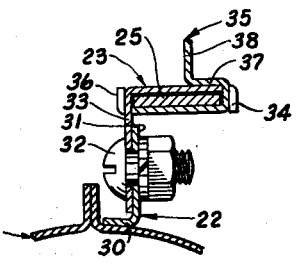
Figure 9:
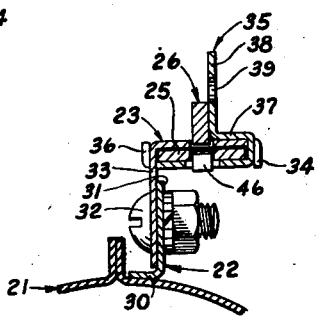
Figure 9 is another sectional view similar to Figure 8 taken along line 9—9 of Figure 6.
Figure 8:
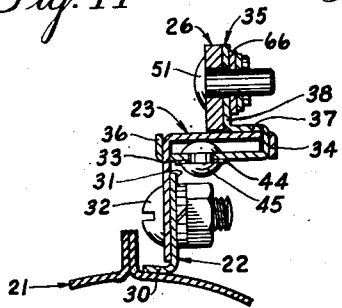
Figure 8 is a sectional view taken along line 8—8 of Figure 6 showing the mounting channel.
Figure 6:
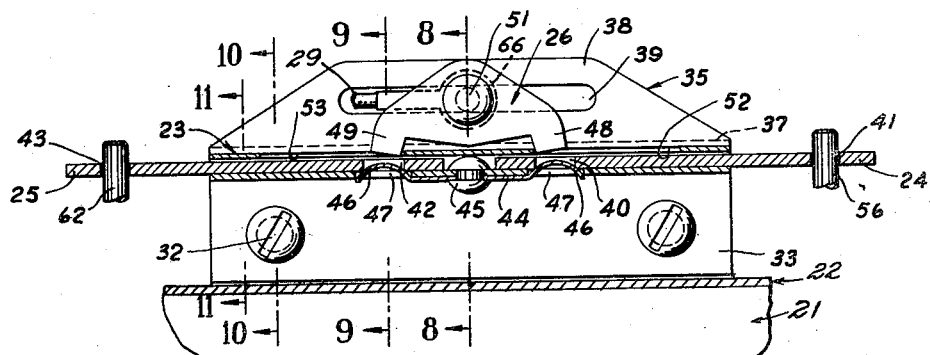
Figure 6 is a side elevational sectional view similar to Figure 5 showing the walking link means in the position shown in Figure 3 and taken substantially along line 6—6 of that figure.
Figure 7:
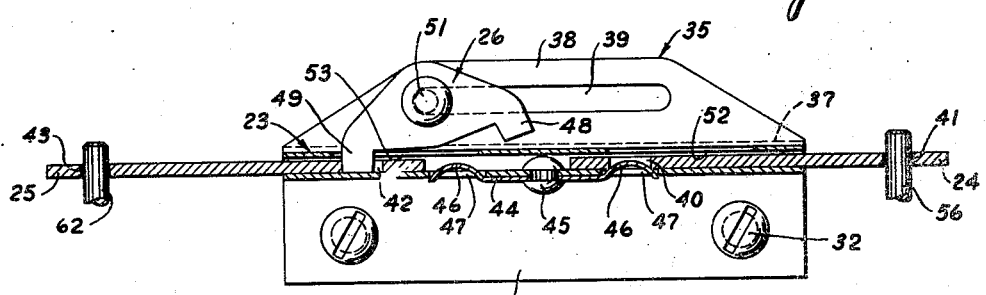
Figure 7 is another sectional view similar to Figures 5 and 6 showing the position of the walking link corresponding to Figure 4 and taken substantially along line 7—7 of the figure.

Figure 10 is still another sectional view similar to Figures 8 and 9 taken along line 10—10 of Figure 6; and Figure 11 is an additional sectional view similar to Figures 8, 9, and 10 taken along line 11—11 of Figure 6.

Figure 1:
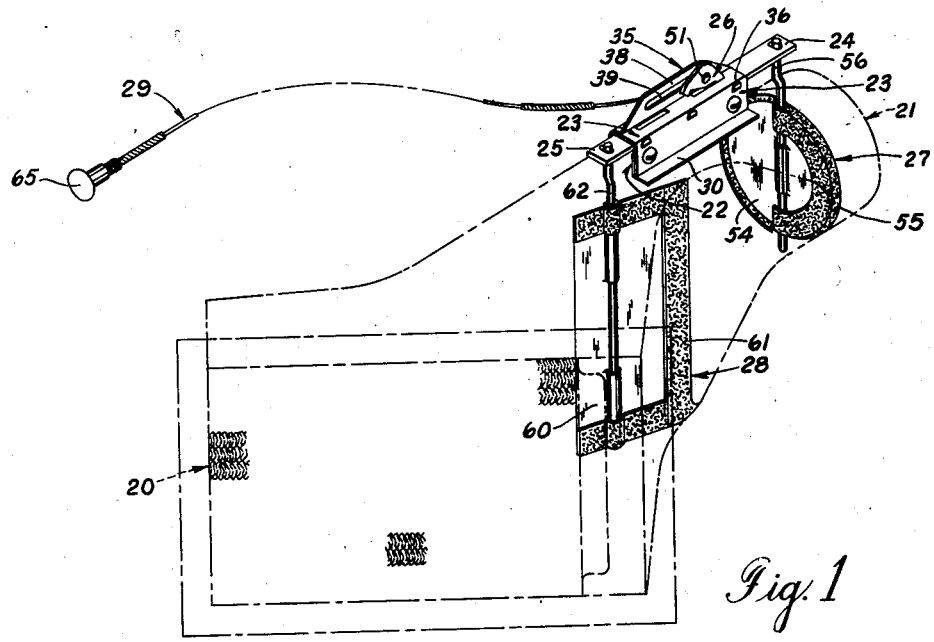

Looking at Figure 1 of the drawings it will be observed that my invention is shown in mounted cooperative disposition with a conventional heating core 20 operatively and receptively positioned at the inner end of an incoming air duct 21. A heater control apparatus is adapted for mounting exteriorly of the air duct and comprises generally a mounting angle 22, a slide bracket 23, a pair of slide bars 24 and 25, a walking link 26, an outer louver 27, an inner louver 28, and an operating cable 29.

For clarity of understanding, the above listed elements shall be described hereinafter in the order in which they appear above along with their operative functionings and appurtenances.

The heating core 20 is herein shown as a conventional hot water type adapted to be connected to the hot water circulating system of an automobile in its preferred form. It may be normally mounted beneath the dashboard of the vehicle, to the body cowling or in like location.

The air duct 21 is adapted for mounting beneath the dashboard of an automobile having its outer end open to the outside air through a door controlled cowl opening or beneath the automobile's hood, and its inner end flared outwardly to register with the heating core 20 in a manner conventional and known in the art. If desired a powered fan may be mounted inside the duct behind the heating core or in front of the heating core to force the incoming air across the core. In the embodiment shown herein, however, the air is forced across the core by impact alone, the air duct scooping up the air as the automobile moves along the highway so that the incoming air will be moving at a relative velocity to the automobile, toward the heating core.

Figure 2:
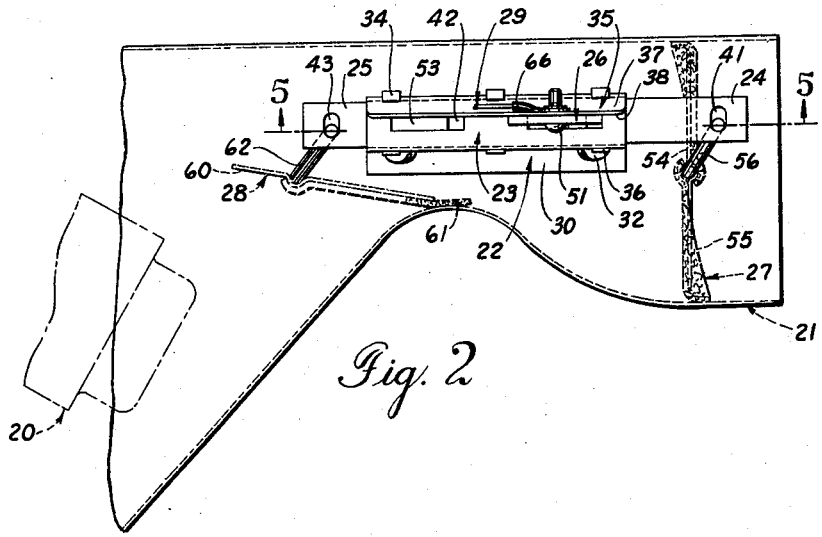
Figure 2 is a plan view of the operative control means shown in Figure 1 displaying the two louvers in closed or neutral position.

The counting angle 22 of the heater control apparatus is shown herein in Figures 1 and 2 as a conventional rectangular angle iron having a right angular bend, running along its length intermediate its lateral extremes, to form a mounting shoulder 30 adapted for fastening to the outer upper surface of the air duct 21, as by spot welding, and as seen in Figures 8 through 11. A remaining upright portion 31 of the mounting angle, after mounting of the shoulder portion 30 on the air duct, will be in vertical position for reception thereon of the slide bracket structure 23, connection therebetween being by suitable bolts and nuts 32, or the like.

The slide bracket 23 is herein shown as comprising a lower angular frame member 33 having a plurality of downwardly turned locking nibs 34 formed along one edge. The shape of the lower frame member 33, as seen in Figures 8 through 11, is substantially that of an inverted L. An interlocking upper frame member 35 is provided for interfitting relation with the first mentioned frame member and is similarly characterized by a plurality of upwardly turned locking nibs 36 positioned along a lower lateral edge thereof and adapted to be received through the lower frame member to lie in parallel relation with its associated locking nibs 34. The upper frame member is further characterized by a reentrant bend portion 37 running along its length and adapted to overlie the lower frame member in mounted position therewith. Additionally the upper frame member is provided with a vertical wall member 38 projecting upwardly and at right angles to the reentrant portion 37 as seen clearly in Figures 1, 5, 6 and 7. A slotted opening 39 is formed along this vertical wall 38 for the mounting of the walking link 26 thereto, as will presently appear.

As will be observed from the cross sectional views of Figs. 8–11, the upper and lower frame members are mounted together in spaced apart relation to form a suitable opening therebetween for the sliding reception of the slide bars 24 and 25. The slide bar 24 is identical to slide bar 25 and is herein shown as a rectangular bar having a rectangular opening 40 formed near one end and a transversely disposed oval opening 41 formed near its opposite end. Similarly, slide bar 25 is provided with a rectangular opening 42 and an oval opening 43. Each slide bar is mounted between the upper and lower frame members for reciprocal sliding movement therebetween. Also the two slide bars are adapted for sliding movement relative to one another as will appear under the operational description later herein.

A resilient spring member 44 is mounted beneath and to the lower side of the upper frame member 35 as by a central rivet 45 and is characterized by a pair of semicircular, upwardly curved detents 46 one formed at each end of the spring member 44. The detents are further adapted to be received by suitable openings 47 formed for that purpose in the lower portion of the upper frame member 35 so as to project upwardly into the space provided for sliding movement of the two slide bars between the upper and lower frame member, so as to interfere with the free sliding movement of the two slide bars as actuated by the walking link.

The walking link 26 is herein shown comprising a substantially triangular shaped metal plate having a pair of depending arms 48 and 49 at its lower apexual corners. The walking link is pivotally mounted to the vertical wall 38 of the upper frame member 35 by means of a rivet member 51 inserted through the slotted opening 39 so that the walking link is adapted for pivotal movement about the rivet as well as sliding movement along the slot 39. The arm 48 is adapted to be received in a rectangular slotted aperture 52 formed in the upper angular portion of the lower frame member 33 associated with the slide bracket 23 to thereby engage the rectangular opening 40 in the slide bar 24 when in its Figure 5 position. Similarly, arm 49 is adapted to engage the rectangular opening 42 of slide bar 25 through another slotted aperture 53 formed adjacent aperture 52 in the lower frame members 33.

The outer louver 27 is herein shown as comprising a circular metal plate 54 to conform substantially to the internal dimensions of the air duct 21 as seen in Figure 1. A gasket member 55, of suitable material such as felt or the like, may be mounted around the periphery of the metal plate 54 to act as a sealing agent with the walls of the air duct when the louver 27 is in its closed Figure 1 position to effectively close over the internal transverse area of the air duct 21. A vertical crank rod 56 may be inserted through a cylindrical connective projection 57 formed along the vertical diametrical axis of the louver 27 and is adapted for pivotal reception in the oval opening 41 of the slide bar 24 and through a suitable circular opening in the bottom of the air duct 21. Upon reciprocal movement of the slide bar 24 the louver 27 will rotate about its pivotal axis, defined by the crank rod 56, to either open or close the air duct 21.

The inner louver 28 is shown herein as a rectangular metal plate 60 bounded on three sides by a suitable gasket 61 and mounted for pivotal movement on a vertical crank rod 62 similar to crank 56. The crank rod 62 may be rigidly inserted through a pair of cylindrical connective projections 63 disposed in aligned vertical relation on the metal plate 60; its upper end being received in the oval opening 43 formed at the outer end of the slide plate 25 and its lower end in a suitable circular opening in the bottom of the air duct. In a manner similar to that described and employed in connection with louver 27, the inner louver is thus adapted for rotational movement about a vertical axis. It should be noted, however, that the inner louver does not close over the air duct 21, but acts merely to deflect the incoming air across or around the heating core 20.

Control of the walking link movement, and thus ultimately the positioning of the inner and outer louvers in the air duct 21, may be conveniently accomplished by a conventional control cable 29, such as a Bowden wire, having an operating knob 65 at one end adapted to be mounted to the vehicle's dashboard. Connection of the control cable 29 to the walking link may be made by a suitable eyelet member 66 adapted to be mounted on and secured to the rivet 53 associated with the walking link.

*Use and operation*

Figure 3:
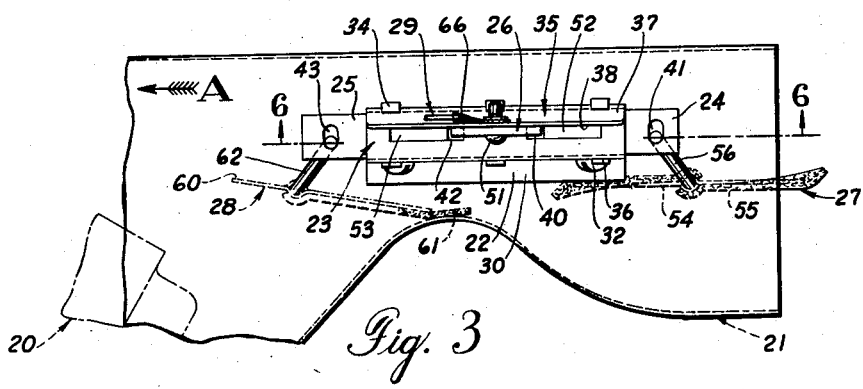
Figure 3 is a top plan view similar to Figure 2 showing the outer louver open and the inner louver in a position suitable for directing the incoming air through the heater core.

In the control and operation of my device, the operator has merely to adjust the position of the control cable 29 by grasping the control knob 65 and pulling the knob out or pushing it in. The positioning of the knob at its all the way "in" position will place the various elements in substantially their Figure 2 position with the air flow through the duct 21 cut off by the outer louver. By pulling the knob about half way out, the walking link 26 will move from its Figure 5 position toward the heating core, or to the left as viewed in Figure 5 under the pulling urging of the control cable 29. This will cause arm 48 to drag slide bar 24 to the left across the interfering detent 46 until the slide bar 24 reaches its Figure 3 and 6 position. Due to the lateral movement of slide bar 24 the crank rod 56 will be turned to cause the outer louver 27 to rotate counterclockwise, as viewed in Figure 2, to thereby open the air duct 21 as seen in Figure 3. Meanwhile the walking link will disengage its right hand arm 48 from the opening 40 in slide bar 24 under the continued pulling of the control cable, the arm 48 pivoting around the upper left hand edge of opening 52 until the walking link reaches an intermediate position as shown in Figure 6. At this stage of control, the fresh air will be allowed to come through the air duct 21 past the outer louver 27 to be diverted by the inner louver 28 across the heating core 20, as indicated by arrow A of Figure 3, thus supplying the vehicle's interior with heated air.

Continued pulling of the control knob and cable will cause the walking link to continue to rotate counterclockwise from its Figure 6 position and to advance along slot 39 with the arm 48 engaging the left hand end of opening 52 in the frame member 33 to rotate the link so that the left hand arm 49 will move downwardly to be received in the opening 42 of the slide bar 25 through the slotted opening 53 in the frame member 33. Such movement of the walking link causes a resilient depression of the left hand detent 46, by the now adjacent arm 49, and under continued pulling of the control cable to the left, as seen in Figure 6, the walking link will cause the slide bar 25 to move to the left toward its Figure 4 and 7 position. Such movement of slide bar 25 will cause crank rod 62 to rotate the inner louver counterclockwise as seen in Figure 3 until it reaches its Figure 4 position. With the control louvers in their Figure 4 position, the incoming fresh air will be directed around the heating core, as indicated by arrow B in Figure 4, to supply fresh cool air to the vehicle's interior when the control knob is all the way "out."

Figure 5:
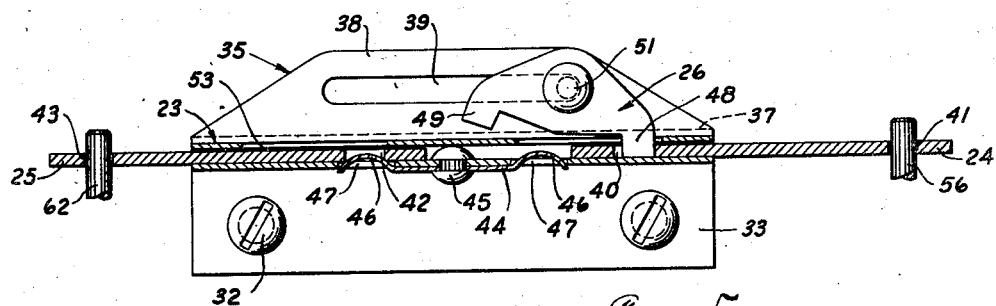
Figure 5 is a detailed side elevational view of the walking link in operative position such as shown in Figure 2 and taken substantially along line 5—5 of Figure 2 looking in the direction of the arrows.

Conversely the various above described elements will assume their above described position, but in reverse sequence as the control knob is pushed toward its all the way "in" position until the air is finally shut off again when the knob is all the way "in" as shown in Figures 2 and 5.

Figure 4:
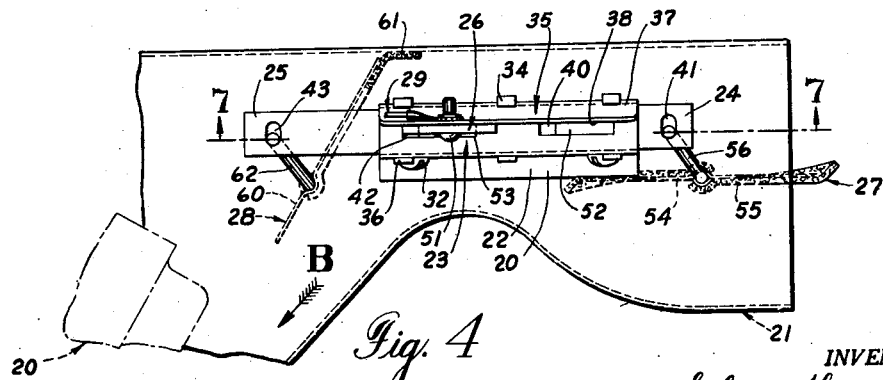
Figure 4 is another top plan view similar to Figures 2 and 3 showing the outer louver open and the inner louver in a position for bypassing the incoming air around the heater core.

It is readily apparent that a variety of mixtures of fresh cool and warm air may be obtained by positioning the inner louver intermediate its Figure 3 and Figure 4 positions to climatize the car's interior to the operator's comfort.

It should further be noted that when one of the walking link arms either 48 or 49 is in engagement with either of the slide bars 24 or 25, the other slide bar is held in position to be readily picked up again by the walking link upon the return movement thereof by virtue of one of the detents 46 being in engagement with one of the rectangular openings 40 or 42 of their respective slide bars.

Thus it may be seen that I have provided a novel device for selectively controlling the flow of air through an air duct to thereby climatically control the heated interior of an automatic vehicle or the like.

While I have herein shown and described a preferred embodiment in which the principles and teachings of my invention may conveniently appear, it will be readily understood that numerous changes, modifications, and substitutions of equivalents may be made without departing from the spirit and scope of my invention, and therefore, I do not wish to be limited to the specific embodiment herein illustrated except as may appear in the following appended claims.

I claim:

1. In combination a supporting bracket, a walking link mounted pivotally for sliding movement along an aperture in said bracket, a pair of depending arms formed as integral parts of said link, a pair of slide bars mounted for coaxial sliding movement in said bracket below said arms, apertures through said bracket for receiving said arms therethrough, and control cable means connected to said link for slidingly actuating said link along said bracket whereby one of said arms will enter one of said apertures to engage one of said slide bars at a time to move said one engaged bar with sliding motion in the same direction as said link is moving.

2. In combination a supporting bracket, a walking link pivotally mounted intermediate its ends to said bracket for sliding movement along a slotted aperture formed therein, a pair of depending arms formed at opposite ends of said link, a pair of slide bars mounted for sliding rectilinear movement in said bracket and disposed adjacent said arms, each communicating with one of a pair of rectangular openings formed in said bracket and invaded by said arms; and control cable means connected for moving said link along said slotted opening whereby one of said arms will engage one of said slide bars rectilinearly to move said engaged bar along said bracket a distance equal to the length of one of said rectangular openings through which said one arm is engaging said one slide bar.

3. In combination a supporting bracket, a pivoted walking link mounted to said bracket in a slotted opening formed therein, a pair of spaced depending arms formed along the lower reaches of said link, a lower frame member forming part of said bracket and having a pair of spaced apart in line rectangular openings formed therealong for alternating reception of said arms, a pair of slide bars mounted in said bracket below said lower frame member, each having a suitable arm receiving opening, formed in one end thereof below one of said rectangular openings in said frame member, and control cable means adapted to actuate said link along said slotted aperture in said bracket whereby one of said arms will engage one of said slide bars in its associated arm receiving opening, to move said one bar toward said other bar a distance equal to the length of one of said rectangular frame openings through which said arm is engaging said one bar and, additionally, will cause said one arm to engage that end of said one rectangular opening, adjacent a corresponding end of said other rectangular opening, whereby said link will pivotally rotate and said one link arm will be disengaged from said one slide bar so that said link will walk between said two rectangular openings to cause said other arm to engage said other arm receiving opening in said other slide bar and said other slide bar will be rectilinearly moved along said bracket away from said one bar a distance equal to the length of said other rectangular opening in said frame member.

4. In combination, a supporting bracket, a pair of slide bars encased therein for coaxial, limited relative sliding movement, a link member mounted pivotally, intermediate its length, to said bracket for sliding movement in an elongated opening formed therein and along a path which is parallel to the path of movement of said two bars, a pair of depending arms formed at opposite ends of said link, each engageable with an opening in one of said bars via one of a pair of separated, coaxial, slotted apertures formed in said bracket, remote control means connected to said link for moving the same along said bracket for engaging one of said arms with one of said bars at a time to move the same with said link, and a portion of said bracket formed intermediate said two bars and said separated slotted apertures for disengaging said one arm from said one bar and causing pivotal actuation of said link for engaging the other of said arms with the other of said bars to move the latter with said link.

5. In a device of the class described, an air duct, a pair of louvers in said air duct, crank rods mounting each of said louvers in said air duct for rotative movement, a supporting bracket mounted exteriorly of said air duct between said crank rods and louvers, a pair of separated slide bars mounted in said bracket for coaxial sliding movement, one pivotally connected with each of said crank rods, pivotal link means mounted on said bracket for sliding movement relative to said bracket and interreaching adjacent ends of said slide bars, and depending arms formed on opposite ends of said links for selectively and alternately engaging each of said bars in turn to move one of said bars at a time with said link whereby said two louvers rotatively may be positioned individually within said duct to control the passage of air therethrough in response to sliding actuation of said link.

6. In a control apparatus for controlling the flow of fresh air to an automobile heater core or the like, the combination comprising an incoming air duct mounted for delivering fresh air to said heating core, an inner louver positioned near said core in said duct and adapted for axial rotative movement in said duct for directing air across or around said core, an outer louver mounted for axial rotative movement in said duct, spaced therein from said inner louver toward the outer end of said duct, and adapted to close over or open the air passage in said duct, a slide bracket mounted exteriorly of said duct between said two louvers, a pair of slide bars slidingly mounted in said bracket, each of said bars being operatively connected at its outer end to one of said louvers, a walking link disposed between the inner opposed ends of said slide bars on said bracket and adapted for pivotal sliding movement relative to said bracket, means for actuating said link with sliding movement along said bracket in one direction whereby said link will engage one of said bars to effect sliding movement of said one bar toward said other whereby one of said louvers will rotate, and means disposed between said bars and said links upon continued movement of said last named means in said one direction for disengaging said link from said one bar and causing said link to engage said other bar thereby to move said other bar slidingly away from said one bar and to rotate said other louver.

7. In combination an air duct, an outer louver pivotally mounted within said air duct on an axially disposed crank rod, an inner louver pivotally mounted within said duct on another axially disposed crank rod, said inner louver being in spaced relation within said air duct from said first mentioned louver, and remotely controlled walking link means mounted on said duct between said two louvers and adapted slidingly to actuate individually a pair of sliding bars, each having pivotal connection with one of said crank rods for selectively rotating each of said louvers about its respective crank rod axis whereby said outer louver may selectively open or close the internal passage of said duct to emit or shut off incoming air and said inner louver may directionally deflect said incoming air either across or around a conventional heating core.

8. In a control apparatus for controlling the flow of air to an automobile heating core or the like, in combination, an air duct, an outer louver mounted within said air duct for axial rotative movement on a crank rod, an inner louver similarly mounted within said duct on a second crank rod for axial rotative movement and in spaced parallel relation with said first crank rod, a slide bracket mounted exteriorly of said duct between said two crank rods, a slide bar mounted in said slide bracket for rectilinear sliding movement and operatively connected at its outer end to one louver crank rod, a second slide bar similarly mounted in said slide bracket in line with first said slide bar and operatively connected at its outer end to said other louver's crank rod, each of said slide bars having an arm receiving opening formed at its inner end, a pivoted walking link mounted on said bracket in a slotted opening formed therein whereby said link is adapted for rectilinear sliding movement relative to said bracket along a path parallel to the sliding path of movement of said two slide bars, a pair of depending arms formed along the lower reaches of said link, each arm adapted to be received in one of said receiving openings of one of said slide bars, control cable means operatively associated with said walking link for rectilinearly actuating said link along said bracket's slotted opening in response to linear actuation of said cable whereby one of said arms is adapted to be received in one of said arm receiving openings in one of said slide bars to rectilinearly move that slide bar toward said other slide bar, which rectilinear actuation thereof will cause rotative actuation of said crank rod and louver associated with said one slide bar, and means interposed on said bracket between said two link arms for engaging said one arm to cause rotative pivotal movement of said walking link under continued linear actuation of said control cable whereby said one arm is disengaged from said one slide bar and said other arm is adapted to engage said other arm receiving opening in said other slide bar to move said other slide bar rectilinearly away from said one slide bar to thereby cause responsive pivotal axial rotation of said other louver and its associated crank rod.

9. In combination, a slide bracket having a pair of transversely related walls, a pair of separated slide bars, housed in one wall of said bracket, for coaxial, limited, relative, sliding movement therein, a link member mounted pivotally to the second of said walls and adapted to move rectilinearly along one side thereof by virtue of an elongated aperture formed therein, said link moving in a path parallel to said slide bars and being related transversely to the latter; a pair of depending arms, formed at the lower edge and one at each end of said link, each arm invading one of a pair of separated rectangular openings formed in said bracket's one wall, each opening providing one arm with access to one of said slide bars, additional openings formed through said slide bars, adjacent their opposed ends, adapted to receive one of said arms upon pivotal actuation of said link in an appropriate direction; detent spring means fixed beneath each of said bars and adapted alternately and selectively to lock with said openings therein, and remotely controlled cable means connected to said link for sliding the same along said bracket's other wall whereby one of said bars selectively may be engaged by one of said arms at a time for movement thereof with said link relative to said other bar upon sliding actuation of said link, with said other bar being held by said detent until engaged and moved by said link's other arm.

JULIUS HEZLER, Jr.

REFERENCES CITED

The following references are of record in the file of this patent:

UNITED STATES PATENTS

| Number | Name | Date |
|---|---|---|
| 1,176,494 | Spelling | Mar. 21, 1916 |